United States Patent
Shin et al.

(10) Patent No.: US 7,390,589 B2
(45) Date of Patent: Jun. 24, 2008

(54) SAFETY APPARATUS FOR SECONDARY BATTERY AND SECONDARY BATTERY HAVING THE SAME

(75) Inventors: Jeong-Soon Shin, Cheonan (KR); Hyun-Joong Kim, Cheonan (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 612 days.

(21) Appl. No.: 10/704,967

(22) Filed: Nov. 12, 2003

(65) Prior Publication Data
US 2004/0096732 A1    May 20, 2004

(30) Foreign Application Priority Data
Nov. 15, 2002   (KR) .................. 10-2002-0071038

(51) Int. Cl.
*H01M 2/12* (2006.01)
(52) U.S. Cl. ......................... 429/82; 429/121
(58) Field of Classification Search ............ 429/64, 429/83, 82
See application file for complete search history.

(56) References Cited
U.S. PATENT DOCUMENTS 6,136,464 A * 10/2000 Wakabe et al. ............. 429/53
6,472,097 B1 * 10/2002 Ohbayashi et al. .......... 429/82
2001/0010877 A1 * 8/2001 Arai ......................... 429/61
2002/0058183 A1 * 5/2002 Ono et al. ................. 429/176

FOREIGN PATENT DOCUMENTS

CN          1271984        11/2000

OTHER PUBLICATIONS

Chinese Office action for Chinese patent application No. 200310116575.1, issued on Apr. 14, 2006 (English translation is attached).

* cited by examiner

*Primary Examiner*—Patrick Ryan
*Assistant Examiner*—Ben Lewis
(74) *Attorney, Agent, or Firm*—Robert E. Bushnell, Esq.

(57) ABSTRACT

A safety apparatus for a secondary battery, which can interrupt current flow in a reliable manner, and a secondary battery having the same, are provided. The safety apparatus includes a case made of an insulating resin material, sealed to have a space inside and mounted inside the secondary battery, at least a portion of the case being shrinkable by an increase in external pressure, and an electrical connection member installed to penetrate the case such that its one end is electrically connected to an electrode plate of an electrode assembly of the battery and the other end is electrically connected to a terminal portion of the electrode plate, the electrical connection member being cut by the shrinking portion of the case.

20 Claims, 6 Drawing Sheets

SAFETY APPARATUS FOR SECONDARY BATTERY AND SECONDARY BATTERY HAVING THE SAME

CLAIM OF PRIORITY

This application makes reference to, incorporates the same herein, and claims all benefits accruing under 35 U.S.C. §119 from an application for SAFETY APPARATUS FOR SECONDARY BATTERY AND SECONDARY BATTERY HAVING THE SAME earlier filed in the Korean Intellectual Property Office on 15 Nov. 2002 and thereby duly assigned Serial No. 2002-71038.

BACKGROUND OF THE INVENTION

1. Field of the Invention

The present invention relates to a secondary battery, and more particularly, a safety apparatus for a secondary battery and a secondary battery having the same.

2. Description of the Related Art

Secondary batteries are generally rechargeable and can be made into a smaller size with high capacity. Typical examples of secondary batteries include nickel-metal hydride (Ni-MH) batteries, lithium (Li) batteries and lithium ion (Li-ion) batteries.

Secondary batteries are classified into cylindrical batteries using a cylindrical aluminum can, rectangular batteries using a rectangular aluminum can, and pouch type batteries accommodated in a thin-film pouch type casing, according to the outer appearance of a casing accommodating a power generating element, that is, an electrode assembly.

A need exists in secondary batteries for a safety device that automatically shuts operation of a battery down when the battery is not operating normally. For example, an internal or an external short circuit in a secondary battery can lead to overheating of the battery and a build up of pressure in the battery. Without the presence of a safety device, the battery would continue to overheat and reach excessive pressures until the battery explodes. In order to prevent such a dangerous explosion, safety devices are used to stop the battery from generating power when the battery starts to act abnormally but before the battery explodes.

SUMMARY OF THE INVENTION

It is therefore an object of the present invention to provide an improved safety device for a secondary battery.

It is also an object of the present invention to provide a pressure induced safety device for a secondary battery.

It is further an object of the present invention to provide a safety device for a secondary battery that produces a complete open circuit when the battery operates abnormally.

It is also an object of the present invention to provide a safety device for a secondary batrery that does not increase the volume of the secondary battery.

It is still an object of the present invention to provide a safety device for a secondary battery that does not result in increased lead length being longer and does not result in increased resistance loss when the battery is operating normally.

These and other objects can be achieved by a secondary battery having a jelly roll electrode assembly within a can, a cap plate sealing the opening of the can with the electrode assembly inside, and a pressure activated safety device disposed inside the battery between the cap plate and the electrode assembly. The safety device is a sealed enclosure having an electrically conductive wire going through. One end of the wire of the safety device is connected to an electrode plate in the electrode assembly and the other end is connected to a terminal on an outside of the battery. When the pressure in the space between the cap plate and the electrode assembly rises above a predetermined threshold, the wire in the safety device is severed so that no power can be delivered to the terminal. This severing prevents a short circuited battery or an overcharged battery from further building up pressure and possibly exploding.

The enclosure of the safety device is kept at one atmosphere in pressure. One side of the safety device is a flexible wall. When the pressure inside the battery in the space between the cap plate and the electrode assembly rises above one atmosphere, the flexible wall bulges into the safety device eventually contacting and then severing the wire, thus shutting down the battery. With this construction, the safety device within the battery does not add to the volume of the battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
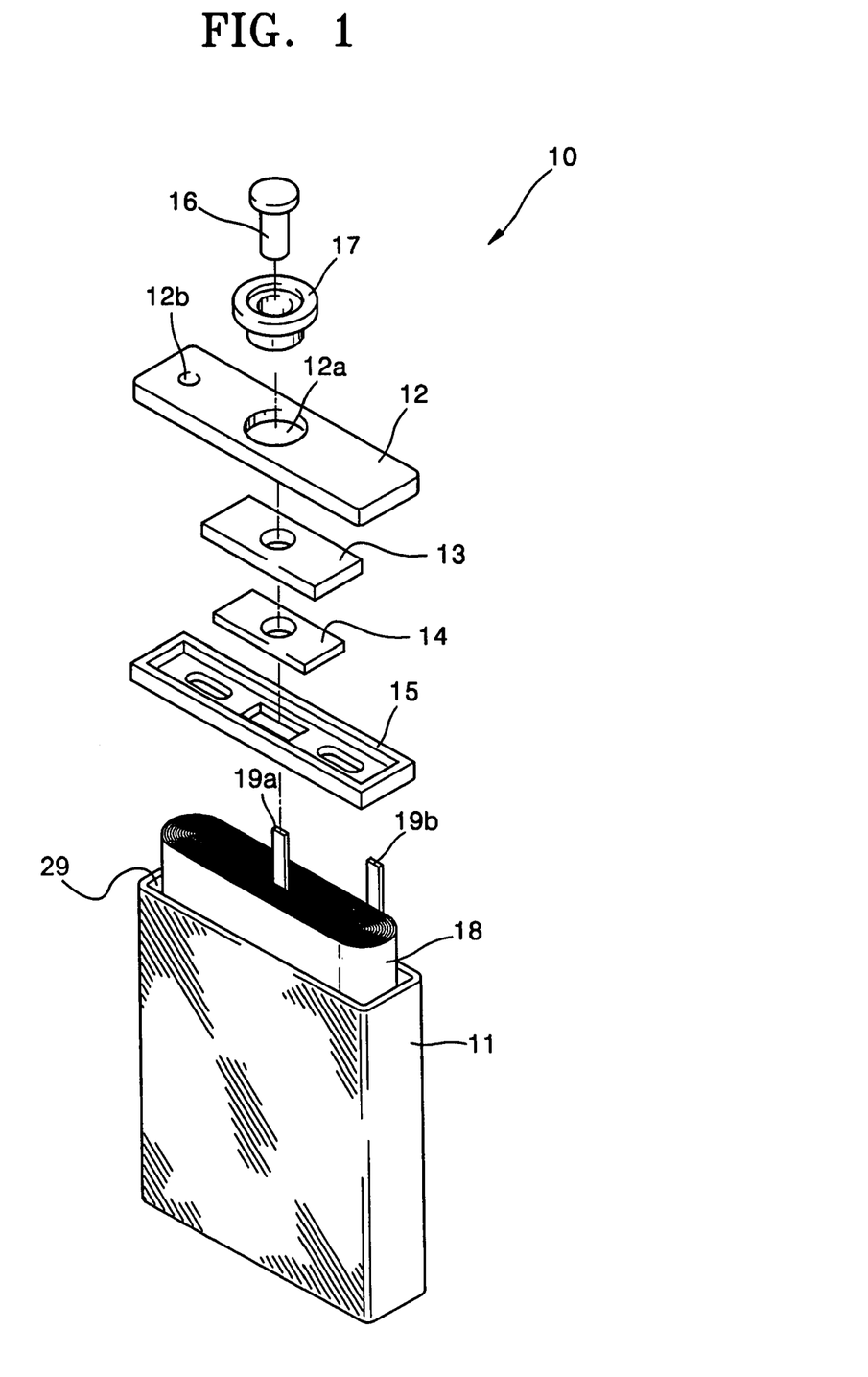
FIG. 1 is an extracted perspective view of a rectangular secondary battery.

Turning now to the figures, FIG. 1 illustrates a rectangular battery 10 fabricated such that an electrode assembly 18 and an electrolyte material are disposed inside a rectangular can 11 having a shape of a cuboid where one plane 29 is open. The electrode assembly 18 is formed such that positive and negative electrode plates are each coated with an active material and are separated from each other by a separator interposed between them. The negative electrode plates, the separator and the positive electrode plates are wound in a jelly-type roll. At the open plane 29 of the electrode assembly 18 is a positive electrode tap 19b and a negative electrode tap 19a connected to the positive electrode plates and the negative electrode plates, respectively.

Referring to FIG. 1, a cap assembly is connected to the open plane 29 of the can 11 for encapsulation. The cap assembly includes a cap plate 12 which encapsulates the opening 29 of the can 11, an insulation tube 17 inserted into an insertion hole 12a formed in the cap plate 12, a pin 16 inserted into a hole formed in the insulation tube 17 and electrically connected to the negative electrode tap 19a of the electrode assembly 18, and an insulation plate 13 which electrically insulates the negative electrode tap 19a from the cap plate 12. Insulation tube 17 electrically insulates pin 16 from all other conductive parts of battery 100. Reference numeral 12b denotes an inlet for an electrolytic solution. After the cap plate 12 is assembled to the can 11, an electrolytic solution is injected into the inlet 12b. After filling, inlet 12b is sealed by a plug (not illustrated). The pin 16 is also electrically connected to a terminal plate 14 disposed under the insulation plate 13. An insulating protection member 15 for preventing fluctuation of the electrode assembly 18 is further provided between the cap plate 12 and the electrode assembly 18. Also, the positive electrode tap 19b of the electrode assembly 18 that is not electrically connected to the pin 16 is directly connected to the internal surface of the can 11 and/or is welded to the bottom of the cap plate 12. In the thus-assembled rectangular secondary battery 10, the pin 16 serves as a negative electrode, and/or the cap plate 12 and the can 11 serves as a positive electrode.

Figure 2:
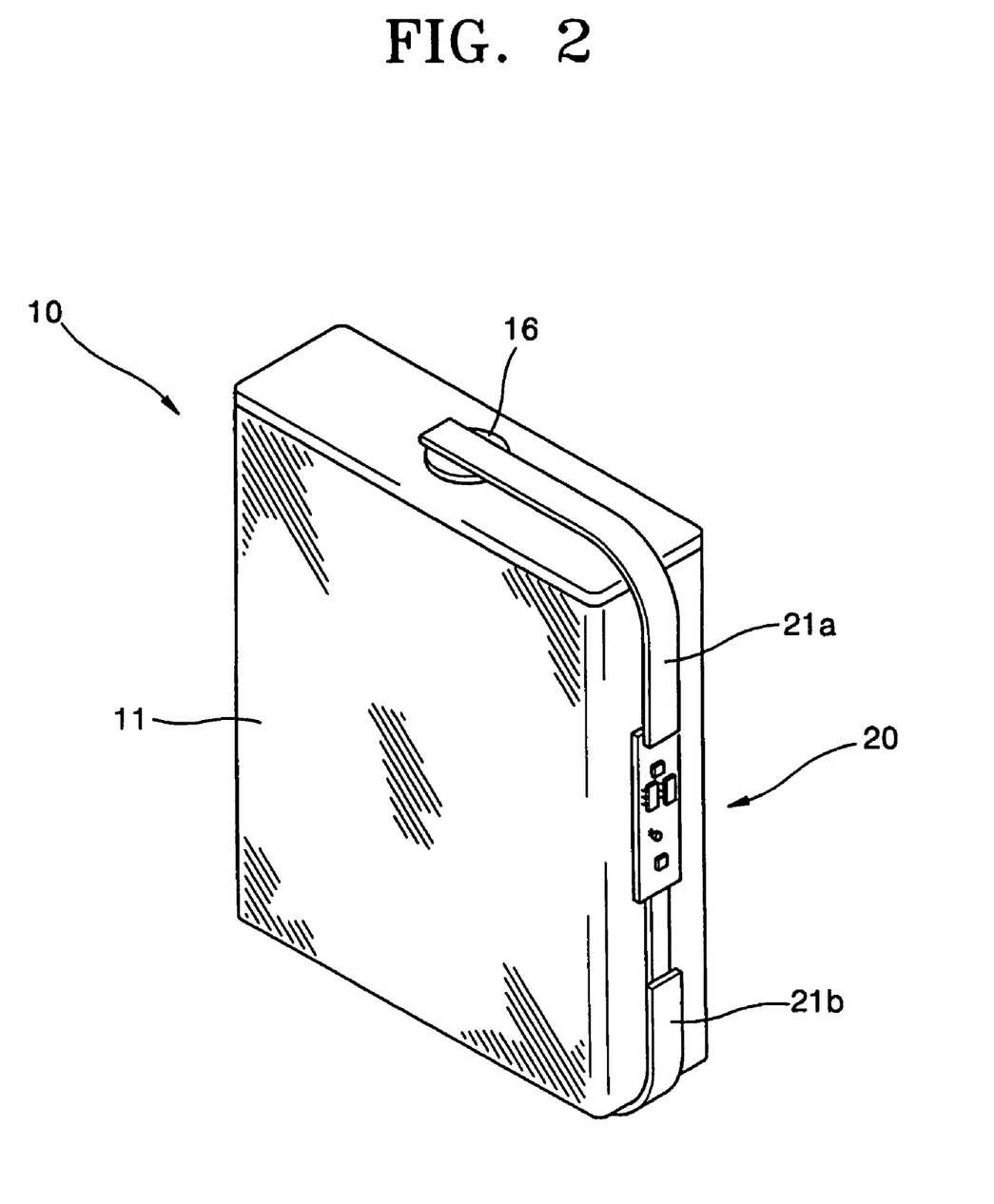
FIG. 2 is a perspective view illustrating a rectangular secondary battery and a safety apparatus attached thereto on the exterior of the battery.

Rectangular secondary batteries maybe equipped with safety devices that may include a PTC (positive temperature coefficient) element, a thermal fuse or a protecting circuit module (PCM) attached to a battery pack. The safety apparatuses 20 illustrated in FIG. 2, are connected to the negative electrode and the positive electrode to be installed at the lateral surface of or bottom of the battery. Connection of the safety apparatuses 20 is made to lead 21a connected to pin 16 and lead 21b connected to the bottom of the battery.

As illustrated in FIG. 2, the safety apparatuses 20 are installed outside a battery, thus increasing the size of the battery pack 10. Further, when a PTC element is deployed, a complete open circuit is not formed. Instead, a PTC element only increases the resistance of the safety apparatus to a finite value when the internal temperature of the battery increase. Because the resistance does not become an open circuit for a PTC element, the battery continues to operate after deployment of the PTC element, so that the safety cannot be ensured. Also, in the arrangement of FIG. 2, the leads 21a and 21b connected to such safety apparatuses are too long, resulting in a voltage potential drop across the leads 21a and 21b, even when the battery is operating normally.

Figure 3:
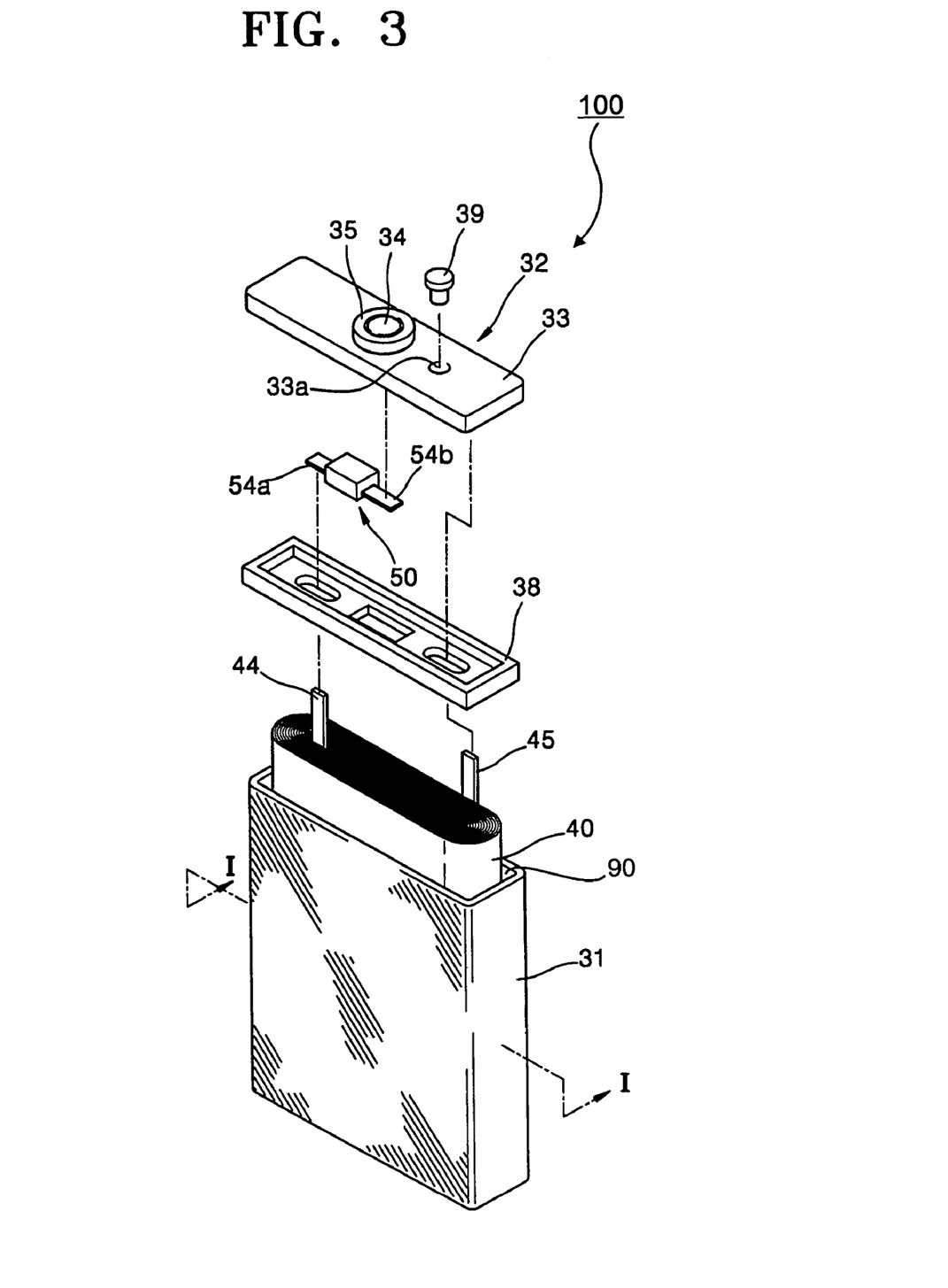
FIG. 3 is an extracted perspective view of a rectangular secondary battery according to an embodiment of the present invention.
Figure 4:
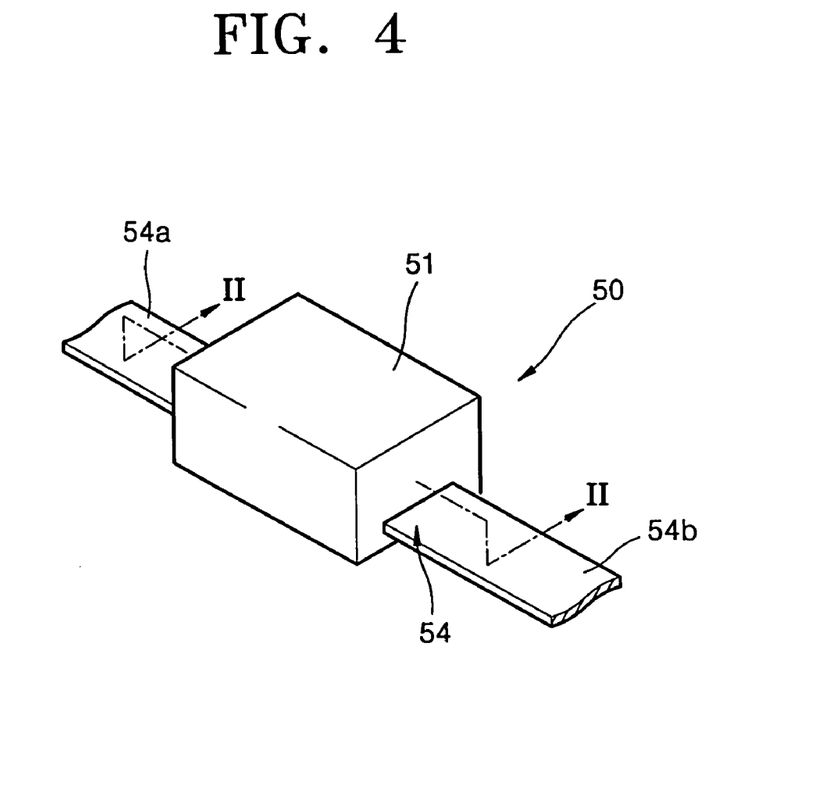
FIG. 4 is a perspective view illustrating a safety apparatus for a rectangular secondary battery according to an embodiment of the present invention.
Figure 5:
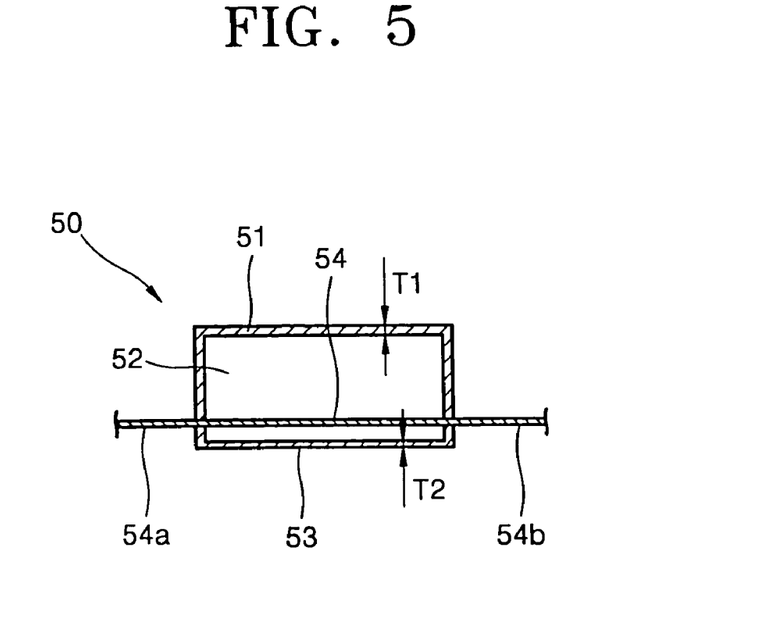
FIG. 5 is a cross-sectional view of the safety apparatus of FIG. 4, taken along the line II-II.
Figure 6:
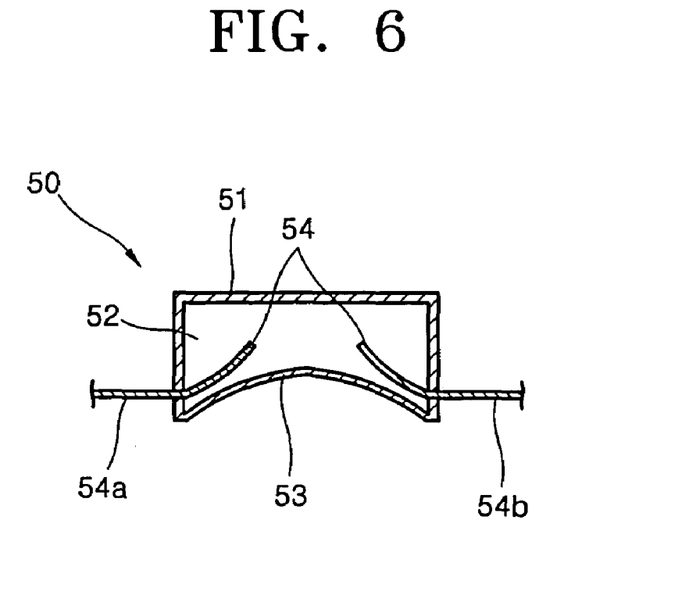
FIG. 6 illustrates the disconnected state of the safety apparatus illustrated in FIG. 5.
Figure 7:
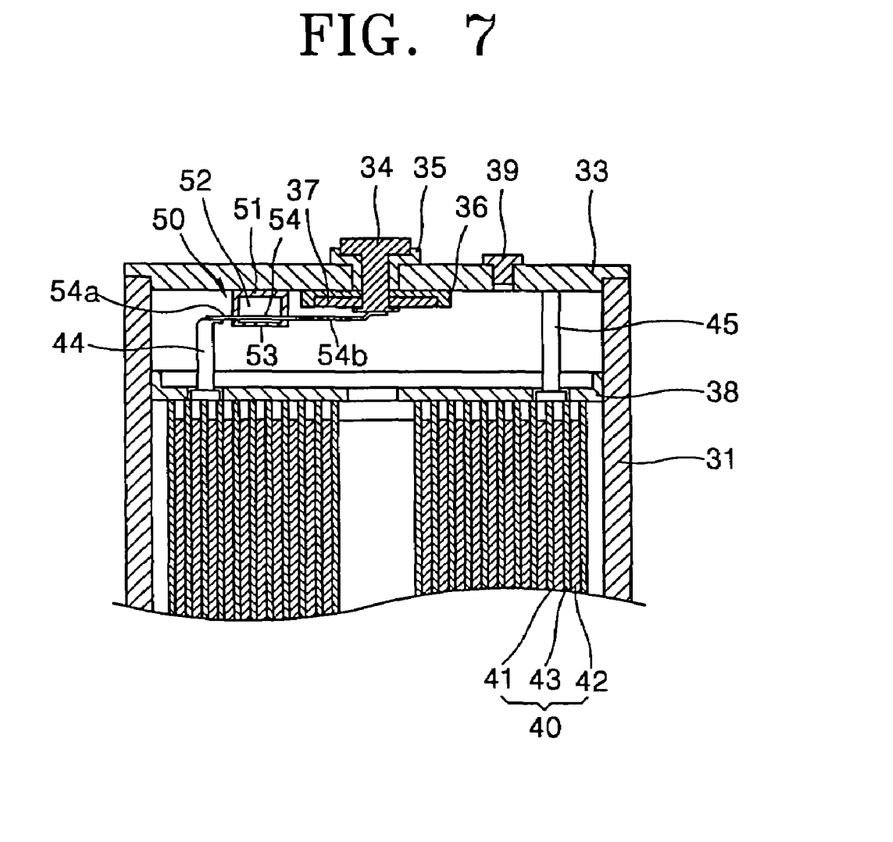
FIG. 7 is a cross-sectional view of the secondary battery with a safety device disposed inside of FIG. 3, taken along the line I-I.
Figure 8:
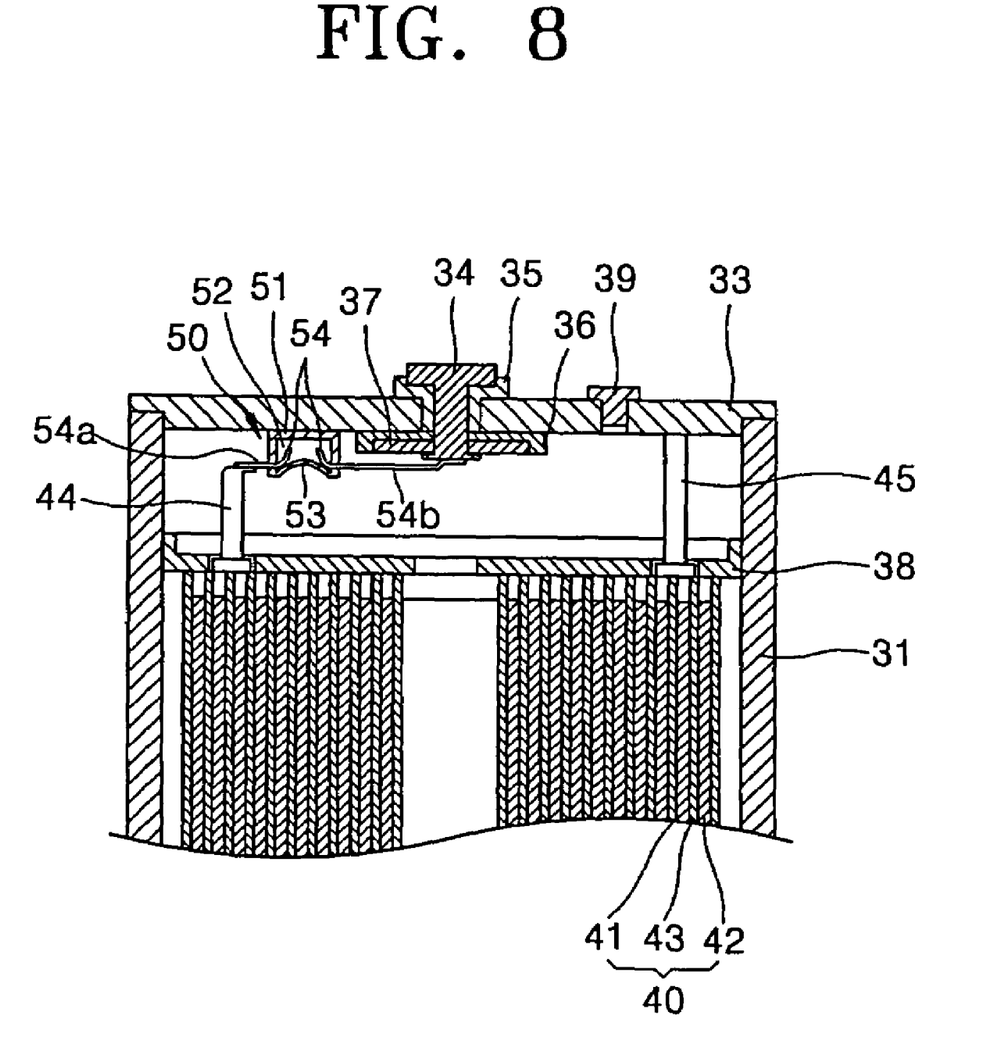
FIG. 8 illustrates the interrupted state of a safety apparatus illustrated in FIG. 7 according to an embodiment of the present invention.

Turning now to FIG. 3, FIG. 3 illustrates an extracted perspective view of a rectangular secondary battery 100 according to an embodiment of the present invention. Battery 100 employs a pressure activated safety device 50. FIGS. 4 through 6 illustrate safety apparatus 50 in detail according to an embodiment of the present invention. FIGS. 7 and 8 is a cross-sectional view of FIG. 3, when assembled, taken along the line I-I, illustrating the state and operation of the safety device 50 within battery 100.

Referring to the drawings, the secondary battery 100 according to the present invention is made up of a can 31 having an opening 90 at one plane, an electrode assembly 40 disposed inside the can 31, and a cap assembly 32 which is connected to can 31 at opening 90 thus encapsulating the electrode assembly 40 disposed within can 31. Turning to FIG. 7, the electrode assembly 40 is formed having a first electrode plate 41, a second electrode plate 42 and a separator 43 disposed between the first electrode plate 41 and the second electrode plate 42. The electrode assembly 40 is preferably a jelly-roll type electrode assembly in which the first and second electrode plates 41 and 42 are stacked with the separator 43 disposed between. The first electrode plate 41, the second electrode plate 42 and the separator 43 are all wound inside the can 31. The first electrode plate 41 can be used as a negative electrode and the second electrode plate 42 can be used as a positive electrode, but not limited thereto. Otherwise, the first and second electrode plates 41 and 42 may be reversely stacked and wound to have opposite polarities.

The negative electrode plate includes a negative electrode current collector made of a strip-shaped metallic foil, e.g., a copper foil. A negative electrode coated portion having a negative electrode complex including a negative electrode active material coated is formed on at least its one plane. For the negative electrode active material, a carbon material can be used. The negative electrode complex includes a binder, a plasticizer and a conductive agent as well as the negative electrode active material.

The positive electrode plate includes a positive electrode current collector made of a strip-shaped metallic foil, e.g., an aluminum foil. A positive electrode coated portion having a positive electrode complex includes a positive electrode active material coated and formed on at least its one plane. For the positive electrode active material, a lithium oxide can be used. The positive electrode complex includes a binder, a plasticizer and a conductive agent as well as the positive electrode active material.

As illustrated in FIGS. 3 and 7, a first electrode tap 44 and a second electrode tap 45 are electrically connected to the first electrode plate 41 and the second electrode plate 42, respectively, Taps 44 and 45 are disposed at the upper portion of the electrode assembly 40 at opening 90 of can 31. The first electrode tap 44 and the second electrode tap 45 are welded and fixed to the first electrode plate 41 and the second electrode plate 42, respectively. A nickel foil can be used for the first electrode tap 44 and an aluminum foil can be used for the second electrode tap 45, but this invention is not limited to this exact configuration.

In a preferred embodiment of the present invention, the can 31 is substantially cuboidal and made of a metal material. Accordingly, the can 31 can serve as a terminal for one of the two electrode plates. Preferably, the can 31 can be formed of Al or Al alloy, which is a lightweight, conductive metal. Also, the can 31 has an opened plane 90 and the electrode assembly 40 can be disposed inside can 31 and exposed at opened plane 90. As illustrated in FIG. 3, the can 31 may be rectangular with angular corners. Alternatively, although not illustrated, the can 31 may be round with corners rounded off.

The cap assembly 32 encapsulates the can 31 at opening 90 of the can 31. The cap assembly 32 also serves to provide an air tight seal between the interior of can 31 and the exterior of the battery 100. This seal prevents gases within the battery from escaping and also prevents air on the outside of the battery from entering the battery. The cap assembly 32 includes a cap plate 33 directly connected to the opening 90 for encapsulation. The can 31 and the cap plate 33 may be formed of the same metal.

In the construction of the secondary battery 100, the battery contains a first terminal and a second terminal. The first and the second terminal are parts on the exterior of the battery that are connected to external circuit components. Within the battery, the first terminal is electrically connected to the first electrode tap 44 which is electrically connected to the first electrode plate 41. Similarly, the second terminal is electrically connected to the second electrode tap 45 which is electrically connected to the second electrode plate 42. In the present invention, the second terminal is can 31 and the first terminal is terminal pin 34. Alternatively, the battery can be constructed so that the first electrode plate 41 is instead electrically connected to can 31 which serves as the first terminal. Terminal pin 34 is electrically insulated from can 31. As illustrated in FIGS. 3 and 7, the secondary battery according to the present invention includes a terminal pin 34 provided at the cap assembly 31 as a first terminal, and the cap plate 33 of the cap assembly 32 or the can 31 as a second terminal. In other words, as illustrated in FIG. 7, the cap assembly 32 includes a terminal pin 34 perforating the cap plate 33 and electrically isolated from cap plate 33 by insulation tube 35. Under the terminal pin 34 is further provided an insulation plate 36 and a terminal plate 37, so that the terminal pin 34 is electrically insulated from the cap plate 33. A lower portion of the terminal pin 34 is electrically connected to a first electrode tap 44 which is electrically connected to first electrode plate 41. Thus, the terminal pin 34 serves as a first terminal for battery 100.

The second electrode tap 45 is electrically connected to second electrode plate 42 as well as being electrically connected to the bottom of the cap plate 33 and/or the internal surface of the can 31, making the overall battery case, excluding the terminal pin 34, serve as a second terminal. Here, the second electrode tap 45 may be directly connected to the second terminal, for example, the internal surface of the can 31. Structures of the first and second terminals are not limited to those stated above. That is, the second terminal can also be formed through a separate terminal pin, like the first terminal, and any other structures can be employed.

After the electrode assembly 40 is inserted into the can 31, a protective case 38 made of an insulating material is installed between the electrode assembly 40 and the cap assembly 32, thereby securely fixing to the electrode assembly 40. In the above-described secondary battery, a safety apparatus 50 according to the present invention is preferably installed inside the can 31, that is, between electrode assembly 40 and the cap assembly 32.

As illustrated in FIGS. 4 through 6, the safety apparatus 50 according to the present invention includes a case 51 made of an insulating resin and an electrical connection member 54 penetrating through the case 51. Case 51 is preferably formed of a polyolefin resin such as polyester or polypropylene. The case 51 preferably is in the shape of cuboid, as illustrated in FIG. 4. This invention is not limited by the exact shape of case 51 as case 51 may instead be of some other shape, like a regular hexahedron, cylinder or sphere.

As illustrated in FIG. 5, the case 51 forms an air tight seal such that the internal space 52 is sealed from the outside. The electrical connection member 54 perforates the space 52. The electrical connection member 54 has ends 54a and 54b exposed outside the case 51, and the respective ends 54a and 54b are electrically connected to either an electrode of a battery or its respective terminal. The electrical connection member 54 is preferably formed of a foil that can easily be broken by a flexible membrane pressing against electrical connection member 54. Alternatively, the electrical connection member 54 may be formed of a thin wire. The electrical connection member 54 may be formed of, but not limited to, copper, and any material that can be cut easily by pressing of another member against the electrical connection member 54. In FIGS. 3 through 8, electrical connection member 54 electrically connects first electrode tap 44 with terminal pin 34. When electrical connection member 54 breaks, the terminal pin 34 is no longer electrically connected to the first electrode plate 41. In alternative embodiments not illustrated, the electrical connection member 54 can instead electrically connect the second electrode tap 45 with either the can 31 and/or cap plate 33.

In addition to the electrical interconnection of safety apparatus 50, another key feature of the present invention is the fact that the safety device resides within the battery 100 and not outside the battery 100. More precisely, safety apparatus 50 is disposed between the cap plate 33 and the electrode assembly 40. Because safety apparatus is underneath the cap plate 33 and not outside the battery as in FIG. 2, the inclusion of safety device 50 does not at all add to the volume of the battery. Further, unlike safety apparatus 20 in FIG. 2, the safety apparatus 50 of the present invention is less likely to be damaged as it is not external to the can and therefore is not exposed.

Further, battery 100 has the following feature. Cap plate 33 serves not only to protect the electrode assembly 40 from damage, cap assembly 32 also seals the air inside the battery from the air outside the battery. Since cap plate 33 is air tight, if battery 100 is not functioning properly, a pressure can build up in the space between the electrode assembly 40 and the cap plate 33. However, this gas will not escape through the cap plate 33 of the battery. It is this build up of pressure between electrode assembly 40 and cap assembly 32 that triggers safety device 50 to deploy because safety device 50 is disposed on an inside of battery 100 between electrode assembly 40 and cap assembly 32. This build up in pressure occurs when the battery is short circuited, overcharged, misused and/or malfunctions. The triggering of safety device 50 prevents battery 100 from exploding.

The case 51 is designed so that space 52 within case 51 shrinks in size as pressure outside case 51 but inside battery 100 builds. According to a preferred embodiment of the present invention, space 52 shrinks because one side 53 of case 51 is flexible and because case 51 is an air tight case. Pressure within case 51 is always held at one atmosphere. If the pressure in the battery between the electrode assembly 40 and the cap assembly 32 rises above one atmosphere, flexible side 53 begins to bulge inward inside the case 51 reducing space 52. The more the pressure builds inside the battery, the more flexible side 53 bulges inward. At a certain predetermined pressure, side 53 bulges inward so much that it breaks electrical connection member 54 thus electrically separating terminal pin 34 from first electrode tap 44, thus preventing the battery from further functioning.

As illustrated in FIGS. 5 and 6, electrical connection member 54 is disposed near flexible side 53 in case 51. In other words, electrical connection member 54 is preferably not disposed in the center of case 51. Preferably, electrical connection member 54 is formed near and parallel to flexible side 53. Flexible side 53 may or may not be formed integral with case 51. As illustrated in FIG. 5, flexible side 53 has a thickness of (T2) where the rest of the sidewalls of the case 51 have a thickness of (T1). It is preferable that T2 is less than T1 as illustrated in FIG. 5. Flexible side 53 may be formed of a highly elastic material, unlike the case 51. In other embodiments (not illustrated), the overall thickness (T1) of the case 51 may be the same as the thickness T2 of the flexible side 53 so that several of all of the walls at the case 51 may entirely shrink as the external pressure inside the battery increases. In this case, the case 51 corresponds to a deformed portion that entirely shrinks.

The electrical connection member 54 perforates case 51. The electrical connection member 54 is also biased to a side of case 51 closest to flexible side 53. In detail, as illustrated in FIGS. 4 and 5, the electrical connection member 54 penetrates the case 51 in a manner in which it is biased toward one side of the space 52. Preferably, the electrical connection member 54 penetrates the case 51 so as to be close to the deformed or flexible portion 53 when only one side of case 51 is flexible. When many or all of the sides of case 51 are flexible, the electrical connection member 54 may penetrate case 51 close to any side of case 51.

In the aforementioned safety apparatus 50, the space 52 being inside the case 51 is encapsulated in a state in which it is maintained at a predetermined pressure, preferably approximately 1 atmospheric pressure (atm). In such a state, when pressure inside the battery (between cap assembly 32 and electrode assembly 40) increases, the deformed portion 53 bends inward into the space 52 where the pressure is smaller than the battery pressure, as illustrated in FIG. 6. Accordingly, the electrical connection member 54 penetrating the space 52 is cut by a physical force of the flexible side 53. As the electrical connection member 54 is cut, the electrode plate 41 and the electrode terminal 34 connected to both ends 54a and 54b thereof are disconnected from each other, so that current does not flow. Electrical disconnection of the electrical connection member 54 by shrinkage of the flexible side 53 of case 51 is possible by adjusting the thickness (T2) of the deformed portion 53. According to the present invention, the deformed portion 53 severs electrical connection member 54 when the pressure inside battery 100 rises to approximately 2 to 20 atm, more preferably 4 to 8 atm.

As illustrated in FIGS. 3 and 7, the safety apparatus 50 may be installed under the cap assembly 32. The safety apparatus 50 may be electrically connected between the first electrode tap 44 and the first terminal portion or between the second electrode tap 45 and the second terminal portion. As illustrated in the drawings, the safety apparatus 50 according to the present invention is connected between the first electrode tap 44 and the first terminal portion, that is, the terminal pin 34.

As illustrated in FIG. 7, in the safety apparatus 50, one end 54a of the electrical connection member 54 exposed outside the case 51 is connected to the first electrode tap 44 and the other end 54b is connected to the first terminal portion, that is, the terminal pin 34. Thus, the first electrode tap 44 and the terminal pin 34 are preferably spaced a predetermined distance from each other so that the safety apparatus 50 is installed therebetween.

Therefore, as illustrated in FIGS. 3 and 7, the electrode assembly of a battery into which the safety apparatus according to the present invention is to be inserted, may be configured such that both electrode taps thereof may be drawn out from edge portions, but it is not so limited. The safety apparatus 50 may be installed at any possible installation place.

As illustrated in FIG. 7, the safety apparatus 50 is preferably configured such that, in a state in which one end 54a of the electrical connection member 54 is connected to the first electrode tap 44 and the other end 54b thereof is connected to the terminal pin 34, a side of case 51 that is opposite to flexible side 53 fixedly contacts the internal surface of the cap plate 33. If the safety apparatus 50 is not fixed within battery 100, an externally exposed portion of the electrical connection member 54 maybe first cut due to movement of the safety apparatus 50. The safety apparatus 50 may instead be fixed to the internal wall of the can 31 or may be seated on the protective case 38.

After the safety apparatus 50 is installed as described above, the cap assembly 32 is attached to the can 31 and an electrolytic solution is then inserted through an electrolytic solution inlet 33a of the cap plate 33. Then, an inlet plug 39 is closed, thereby preventing leakage of the electrolytic solution.

The invention has been, for convenience, described with regard to a safety apparatus for a rectangular secondary battery, but is not so limited. The safety apparatus according to the present invention may be employed to a cylindrical secondary battery or any types of secondary batteries that can incorporate the safety apparatus.

The secondary battery having the above-described configuration operates as follows. When overcharge or internal short-circuit occurs to the assembled secondary battery, as illustrated in FIG. 7, the internal temperature of the battery may increase. In this case, gas may be generated from the electrode assembly 40, resulting in an increase in internal pressure inside battery 100 between electrode assembly 40 and cap assembly 32. When the internal pressure of the battery increases, as illustrated in FIG. 8, the flexible side 53 of the safety apparatus 50 bends inward into the space 52, so that the electrical connection member 54 perforating the space 52 may be cut by the bulging inward of the flexible side 53. If the electrical connection member 54 is cut, the first electrode tap 44 and the terminal pin 34 connected to both ends 54a and 54b of the electrical connection member 54 are electrically disconnected from each other, so that current does not flow to the terminal pin 34. As described above, the safety apparatus 50 according to the present invention can exhibit a complete, open circuit interruption of current flow by disconnecting the first electrode tap 44 from the terminal pin 34. Also, since the safety apparatus 50 is installed inside the battery, installation thereof does not make the battery any more bulky. Further, since the first electrode tap 44 and the terminal pin 34 are connected to each other by a shortest distance, resistance loss due to the inclusion of safety apparatus 50 does not result.

The safety apparatus for a secondary battery according to the present invention and the secondary battery including the safety apparatus have the following advantages. First, when a battery operates abnormally, an electrode assembly and a terminal portion are electrically disconnected from each other by a physical force so that safety of the battery can be ensured. Second, since a simplified safety apparatus is incorporated into the battery, a volumetric increase of a battery pack can be prevented. Third, since it is not necessary to increase the length of a lead for connection of the safety apparatus, resistance loss can be reduced.

While the present invention has been particularly illustrated and described with reference to exemplary embodiments thereof, it will be understood by those of ordinary skill in the art that various changes in form and details may be made therein without departing from the spirit and scope of the present invention as defined by the following claims.

What is claimed is:

1. A safety apparatus in a secondary battery, the safety apparatus comprising:
   a case made of an insulating material, said case being sealed and having a space inside, said case being mounted inside the secondary battery, said case comprising one side that is flexible wherein said flexible side bulges inward into said inside space when air pressure in said battery increases above one atmosphere; and
   an electrical connection member adapted to perforate through the case such that one end of the electrical connection member is electrically connected to an electrode plate of an electrode assembly of the battery and the other end is electrically connected to a terminal portion on an outside of the battery, the electrical connection member being comprised of foil and being adapted to be cut by the inward bulge of the flexible side of the case, the electrical connection member being supported only by opposing sidewalls of the case.

2. The safety apparatus of claim 1, wherein the case is disposed inside said battery between a cap assembly and an electrode assembly, the cap assembly being air tight allowing the space between the cap assembly and the electrode assembly to pressurize during use of the battery.

3. The safety apparatus of claim 1, wherein the flexible side of the case has a smaller thickness than other sides of the case.

4. The safety apparatus of claim 1, wherein the pressure inside the case is one atmosphere, wherein the inside of the case is sealed and air tight.

5. The safety apparatus of claim 1, wherein the flexible side of the case faces the electrode assembly of the secondary battery and a side opposite from said flexible side of the case is attached to a cap assembly of the battery.

6. The safety apparatus of claim 1, wherein the electrical connection member perforates the case and is parallel to said flexible side and closer to said flexible side than a central axis of the case.

7. The safety apparatus of claim 1, wherein the electrical connection member is electrically disconnected by the flexible side when the pressure inside the battery acting on the case is between 2 and 20 atm.

8. The safety apparatus of claim 7, wherein the electrical connection member is electrically disconnected by the flexible side when the pressure inside the battery acting on the case is between 4 and 8 atm.

9. The safety apparatus of claim 1, the electrical connection member and the flexible side of the case being spaced apart by a gap.

10. A secondary battery, comprising:
   an electrode assembly having a first electrode plate, a second electrode plate and a separator which insulates the first electrode plate from the second electrode plate;
   a can accommodating the electrode assembly;
   a cap plate for encapsulating the can containing the electrode assembly, said cap plate providing an air tight seal for an interior part of said can and an interior of said battery;
   first and second the terminal portions electrically connected to the first and second electrode plates, respectively; and
   a safety device, comprising a case made out of electrically insulating material, said case being sealed so that a space inside the case is maintained at approximately one atmosphere in pressure, the safety device being mounted inside the secondary battery between the cap plate and the electrode assembly, a portion of the case being flexible according to changes in pressure acting on the safety device, a conductive electrical connection member being installed through the safety device such that one end of the electrical connection member is electrically connected to the first electrode plate of the electrode assembly of the battery and the other end of the electrical connection member is electrically connected to a first terminal portion of the battery, the electrical connection member being cut by the shrinking portion of the case when the case is subjected to excess pressure, the electrical connection member perforating opposite sides of the case, the electrical connection member being absent of support between the opposite sides of the case through which the electrical connection member perforates.

11. The secondary battery of claim 10, wherein said flexible portion of the case bulges inward when exposed to external pressure in excess of one atmosphere.

12. The secondary battery of claim 10, wherein the flexible portion is integrally formed with the rest of the case.

13. The secondary battery of claim 10, wherein the flexible portion has a thickness smaller than other portions of the case.

14. The secondary battery of claim 10, wherein the flexible portion is made of polyolefin resin.

15. The secondary battery of claim 10, said first terminal portion being a conductive member that perforates the cap plate, said first terminal portion enabling electrical connection of the battery to the external components.

16. The secondary battery of claim 15, wherein a pressure inside said battery increases to above two atmospheres when said battery is short circuited or overcharged.

17. The secondary battery of claim 10, the electrical connection member and the flexible portion of the case being spaced apart by a gap.

18. The secondary battery of claim 10, wherein the electrical connection member is electrically disconnected when the case is subjected to a pressure of 4 to 8 atm.

19. The battery of claim 10, said first terminal portion being said can.

20. The secondary battery of claim 10, the case having a cuboid shape.

* * * * *